United States Patent Office 3,067,149
Patented Dec. 4, 1962

3,067,149
STABILIZATION OF POLYURETHANE
RESIN FOAMS
Bernard A. Dombrow, Teaneck, and Alvin Lerner, North
Bergen, N.J., assignors to Nopco Chemical Company,
Newark, N.J., a corporation of New Jersey
No Drawing. Filed May 4, 1960, Ser. No. 26,685
8 Claims. (Cl. 260—2.5)

The present invention relates to the stabilization of foamed polyurethane resins. More particularly, this invention relates to the prevention of deterioration upon aging of flexible foamed polyurethane resins prepared from polyethers by the one-shot method in which organo metallic tin catalyst are used.

In this system, a polyether, an organic polyisocyanate, water, surface active agent and a catalyst mixture comprising amine and an organo metallic tin catalyst are brought together in intimate contact with agitation whereupon they react exothermically to form the foamed product. However, the presence of some of these tin catalysts in the final foamed product brings about deterioration of the product upon aging. This is because many of these organo metallic tin catalyst tend to promote decomposition of the ether linkage in the foamed product. This deterioration is manifested by a general weakening of the mechanical properties of the foam, e.g., compression load, tensile strength, tear strength, etc. In fact, disintegration of the foam has occurred in some instances. The extent of this deterioration has been found to be a function of time, quantity of catalyst present in the final foamed product and temperatures encountered during the production of the foam and during storage and use of the foam. This deterioration can also be demonstrated by carrying out accelerated aging tests, e.g., by heating the foamed product for 12 or 24 hours in dry heat at 250° F. Under these tests, the deterioration has been shown by marked loss in compression load, tensile strength, tear strength and in some cases, by complete destruction of the sample. It has also been found that one-shot flexible polyether based foamed products which contain diols, alone or in admixture with polyols, as well as the lower density products are more susceptible to deterioration due to the presence of these tin catalysts.

Attempts to obviate this deterioration have been made. For example, use of tartaric acid, catechol and butyl catechol have been suggested as additives to the formulations which contain the organo metallic tin catalyst. Even though the presence of tartaric acid minimized compression load loss due to the high concentration of tin catalyst, it was found that the presence of this additive slowed down the foaming process thereby bringing about an inferior product. That is, the rise time increased, sagging occurred and coarse cells resulted. The presence of catechol and butyl catechol was also found to be unsatisfactory. These additives when present in the foam introduced undesirable odor and color to the foam.

Accordingly, it is an object of the present invention to overcome the deleterious effects brought about by the presence in flexible foamed polyurethane resins of those organo metallic tin compounds which tend to promote decomposition of the ether linkage in the foamed product.

It is another object to prevent the deterioration of one shot flexible polyether based foamed polyurethane resins, said deterioration resulting from the presence of these organo metallic tin catalysts which tend to promote decomposition of the ether linkage in the foamed product.

A further object is to provide for one-shot flexible polyether based foamed polyurethane resins prepared from those organo metallic tin catalysts which tend to promote decomposition of the ether linkage in the foamed product and containing same in said finished foamed product characterized by being resistant to the degradative effects of said tin catalysts.

Another object is to provide for a process for preparing one-shot flexible polyether based foamed polyurethane resins making use of organo metallic tin catalysts which tend to promote decomposition of the ether linkage in the foamed product so that the resulting product is characterized by being resistant to the degradative effect of said tin catalysts.

Further objects will become apparent from the detailed description of the invention given hereinafter. It is intended however, that the detailed description and specific examples do not limit the invention but merely indicate the preferred embodiments thereof since various changes and modifications within the scope of the invention will become apparent to those skilled in the art.

We have unexpectedly discovered that the above and other objects can be successfully accomplished in the following manner. When the one-shot flexible polyether based foams which also contain those organo metallic tin catalysts which tend to promote decomposition of the ether linkage in the foamed product have present certain halogen containing stabilizers or mixtures of such stabilizers, the aforesaid deterioration is prevented or effectively reduced. The halogen containing stabilizers are esters of halogenated alcohols such as 2-chloroethanol and dichloropropanol and acids such as phosphoric, phosphorous, boric and para-toluene sulfonic acids. Examples of these esters are tris (3,3-dichloropropyl) phosphate and tris(2-chloroethyl) phosphate. Another class of halogenated materials which we have found to be useful as stabilizers are halogenated aliphatic, alicyclic and aromatic hydrocarbons having a halogen content of at least about 25% by weight of the total, e.g., Paroil 170 LV, a liquid chlorinated paraffin having a chlorine content of about 70% by weight of the total and a molecular weight of 430 to 470; Chlorowax 40, a liquid chlorinated paraffin having a chlorine content of about 40% to 42% by weight of the total and an average molecular weight of 570; and Halowax 1014, a hard amorphous wax which is essentially a mixture of pentachloro and hexachloronaphthalenes having a chlorine content of about 62% by weight of the total and a softening point (ball and ring) of 135° to 139° C.

The above halogen containing stabilizers must also be soluble in at least one of the following materials which are utilized in preparing the foam system, i.e., the polyether, isocyanate or water and must also be compatible in the resulting system when all of these materials are brought together. The stabilizers or mixtures thereof as described above are present in amounts sufficient to prevent or substantially reduce the deterioration brought about by the presence of the aforesaid organo metallic tin catalysts. Generally, the stabilizer or mixture thereof can be present in amounts of from about 0.5% to about 5.0% by weight of the polyether component.

The applicability of our halogen containing stabilizers to flexible one-shot foamed polyurethane resins is not limited to the specific formulations or procedures described herein. The invention in its broadest aspect applies to flexible one-shot foamed polyurethane resins whenever polyethers and organo metallic tin catalysts which tend to promote decomposition of the ether linkage in the foamed product are utilized.

Some of the above stabilizers have shown promise as self-snuffing agents in urethane systems. The quantity of stabilizer required for this purpose is greater than that required for stabilization against deterioration due to the tin catalysts. Moreover, the large amounts of these materials which are needed for self-snuffing purposes are detrimental to the physical and chemical properties of the foam, e.g., as shown by humidity aging tests in which deterioration of the foam occurs. However, the quantities of the stabilizers which are utilized in the present invention are much less than the amount needed as self-snuffing agents and hence are not detrimental to the foam.

The one-shot flexible polyether based foams which contain our stabilizers can be prepared as follows. A polyether, an organic polyisocyanate, water, a surface active agent, a catalyst mixture which comprises amine and the tin catalyst and the halogen-containing stabilizer or mixtures thereof, which can be dissolved in the polyether, isocyanate or water, depending upon its solubility, are brought together in intimate contact by agitation in a vessel whereupon exothermic reaction occurs to form the foamed product. Should the halogen containing stabilizer be reactive with the isocyanate, then it of course is introduced in the polyether or water. Also, if desired, a halogenated saturated aliphatic hydrocarbon having a boiling point between about 0° C. and about 60° C. can be added to the polyether or isocyanate as an auxiliary blowing agent.

Useful polyethers are described as follows. Individual polyethers having a functionality or two or more can be used. That is, polyethers which are diols, triol, tetrols, etc., can be used alone or in admixture with each other. The polyethers generally may have an equivalent weight of between about 100 and about 2000. Alternatively, there can be added to a difunctional polyether, a low molecular weight polyol or mixtures thereof having at least three hydroxyl groups such as glycerine, trimethylolpropane, hexanetriol, pentaerythritol, sorbitol etc.

Examples of difunctional polyethers are polyoxyethylene glycols of molecular weights of 200, 400, 600, 800, 1000, 2000 and up to 4000; polyoxypropylene glycols of molecular weights of 400, 750, 1200, 2000, 4000 and block polymers of polyoxyethylene and polyoxypropylene glycols having molecular weights of 400 to 4,000 such as the Pluronics of Wyandotte Chemical Corp. These block polymers can be prepared by the sequential addition of ethylene oxide to polyoxypropylene glycols. They can be represented by the formula $$HO(C_2H_4O)_a(C_3H_6O)_b(C_2H_4O)_cH$$

The molecular weight of the base, i.e., the polyoxypropylene portion of the molecule can vary from, e.g., from about 600 to 2500. Hence, in these instances each $b$ in the above formula can vary from about 10 to 43. The oxyethylene content can vary from, e.g., 10% to 20% by weight of the total. Exemplary of these materials are materials having a molecular weight of between 801 and 1000 for the base portion of the molecule, i.e., the polyoxypropylene portion, and from 10% to 20% of ethylene oxide in the molecule; materials having a molecular weight of between 1501 and 1800 for the base portion of the molecule and from 10% to 20% by weight of ethylene oxide in the molecule and materials having a molecular weight of between 2101 and 2500 and having from 10% to 20% by weight of ethylene oxide in the molecule.

Illustrative of polyethers having three or more hydroxyl substituents, i.e., a functionality of at least three, are ethylene oxide and propylene oxide condensates with amines, glycerine, hexanetriol, trimethylol propane, pentaerythritol, etc. For instance, the Tetronics of Wyandotte Chemical Corporation can be used. These tetrafunctional materials are prepared by the sequential addition of propylene oxide and ethylene oxide to ethylenediamine. They can be represented by the formula

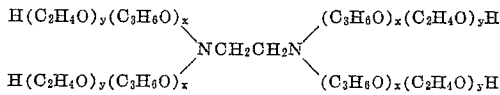

The molecular weight of the base, i.e., the condensation product of propylene oxide with ethylenediamine, can vary from about 292 to 4500. Hence, each $x$ in the above formula represents an average number of from about 1 to 20. The oxyethylene content can vary from, e.g., 10% to 19% by weight of the total. Hence, each $y$ in the above formula can be calculated knowing the molecular weight of ethylene oxide. Some specific Tetronics are those having a molecular weight of between 501 and 1000 for the base portion of the molecule, i.e., the condensation product of propylene oxide and ethylenediamine and from 10% to 19% by weight of ethylene oxide in the molecule; a molecular weight of 1501 to 2000 for the base portion of the molecule and from 10% to 19% by weight of ethylene oxide in the molecule and a molecular weight of 2501 to 3000 for the base portion of the molecule and from 10% to 19% by weight of ethylene oxide in the molecule.

Other useful materials which are commercially available, are the trifunctional glycerine-propylene oxide adducts, e.g., glycerine condensed with up to 50 moles of propylene oxide.

When ethylene oxide or propylene oxide is added on to hexanetriol, trimethylol propane, pentaerythritol, etc. to prepare the polyol, the resulting condensates preferably have molecular weights of about 700 to 4000.

Suitable polyisocyanates, alone or in admixture with each other which can be used herein are 4,4′,4″-triphenylmethane triisocyanate; 2,2,4′-triisocyanatodiphenyl ether; toluene diisocyanate (2,4 and 2,6 isomers and mixtures of these isomers, e.g., 80% by wt. 2, 4 and 20% by wt. 2,6); 1,5 naphthalene diisocyanate; 1,4 phenylene diisocyanate; diphenyl diisocyanate; triphenyl diisocyanate; methylene bis(4-phenylisocyanate); trimethylene diisocyanate; 1,4-tetramethylene diisocyanate; and propylene 1,2-diisocyanate.

The ratio of polyisocyanate to polyether present in the reaction system can vary within rather wide limits. Ordinarily, the quantity of polyisocyanate used will be equivalent to from about 75% to about 120% by weight of the amount theoretically required to react with the reactive hydrogen atoms in the reaction mixture. Preferably, the quantity of polyisocyanate will be equivalent to from about 95% to about 110% by weight of the amount theoretically required to react with the reactive hydrogen atoms in the reaction system.

Examples of useful surface active agents which can be present in an amount of from about 0.05% to 2% by weight of the polyether are water-soluble siloxane-oxyalkylene block copolymers as described in United States Patent No. 2,834,748, Bailey et al., May 13, 1958.

The catalyst mixture comprises a mixture of the amine and tin catalyst. Useful amines are N-alkyl morpholines such as N-methyl morpholine and N-ethyl morpholine; tertiary amines, e.g., trimethyl amine, triethyl amine, triethylene diamine, N,N,N′,N′-tetramethyl-1,3-butane diamine; piperazine and piperazine derivatives such as N-methyl piperazine. These amines are present in amounts of from about 0.05% to about 2% by weight of the polyether.

The tin catalysts are generally present in amounts of from about 0.1% to about 1.0% by weight of the polyether. As indicated previously, the tin catalysts with which we are concerned are those which tend to promote decomposition of the ether linkage of the foamed product and include dialkyl tin dialkylates such as dibutyl tin dilaurate; dibutyl tin di-2-ethyl hexoate and dibutyl tin diacetate.

The amount of water present is from about 0.1% to about 5% by weight of the polyether.

Also, if desired, a halogenated saturated aliphatic hydrocarbon or mixtures thereof can be used as auxiliary blowing agents. When a halogenated saturated aliphatic hydrocarbon or mixtures are so used, they can be present in trace amounts up to about 20% by weight of the polyether. Exemplary of these materials are monofluorodichloromethane; monofluorotrichloromethane (Freon 11); monochloroethane; monochloromonofluoroethane; 1,2-dibromo, 1,1,2,2-tetrafluoroethane; 1,1,2-trichloro 1,2,2-trifluoroethane; 1,1,2,2 - tetrafluoro 1,2-dichloroethane; 1,2-difluoro 1,1,2,2-tetrachloroethane; dichloromethane; dibromomethane and their mixtures. Those materials which normally are gases at operating conditions can be cooled and dissolved in the polyether to lower their vapor pressure. These materials are further characterized by being inert with respect to the various polyethers, isocyanates, etc., with which they come in contact.

The following examples further illustrate our invention, however, they are not to be construed in a limiting manner. All parts given are parts by weight. It must also be appreciated that the description of the various components which are prepared in the examples is not limiting. The various materials which are placed in each component are selected on a basis of convenience, i.e., with what other materials are they soluble or compatible. For this reason, the catalyst mixture which comprises an amine and the tin catalyst is usually split up. That is, the amine, when water soluble, is admixed with water and the surface active agent while the tin catalyst is admixed with the polyether.

In the following four examples, the three indicated components were prepared.

Polyether component: Pts.

Polypropylene oxide adduct of glycerine (mol. weight about 3,000) _____ 100
    Tris (2-chloroethyl) phosphate [1] _____ ([2])
    Dibutyl tin dilaurate [3] _____ 0.5

Activator component:

Water _____ 3.5
    Surface active agent [4] _____ 1.0
    Triethylamine _____ 0.07

Isocyanate component:

m-Toluene diisocyanate (80% by weight 2,4 isomer and 20% by weight 2,6 isomer) ____ 37.8

[1] Chlorine content of 28% by weight of total.
[2] See examples.
[3] This concentration level is higher than used with present formulations. However, it affords a more critical test of stabilization.
[4] A material as described in Example I(a) of Patent No. 2,834,748, Bailey et al., May 13, 1958.

The above components were brought together and admixed for about 20 seconds with a Conn mixer mounted on a Jarvis stirrer. Then the resulting admixture which began to react was poured into open cardboard boxes measuring 6″ x 6″ x 7″ and allowed to rise with no interference.

Samples measuring 2″ x 2″ x 1″ were cut from the resulting foamed material and their Compression Load Deflection (C.L.D.) at 25% strain was determined in accordance with ASTM D-1564-58T. The samples were then aged by heating in an oven for either 12 or 24 hour periods. Dry heat was maintained during heating by forced air convection. After this aging was completed, the Compression Load Deflection at 25% strain of the samples was again determined. The C.L.D. at 25% strain value which was determined after aging was subtracted from the value determined before aging. The difference divided by the original C.L.D. value multiplied by 100 is interpreted as follows. A positive value represents a loss in C.L.D., while zero, a low positive or a negative number represents no change, or a gain in C.L.D. value due to improved curing brought about by the heating. A 5% loss is deemed acceptable. Densities were determined by direct measurement of the weight and volume of the tested sample. The data set forth below were obtained as indicated above.

| Ex. | Pts. of tris (2-chloroethyl) phosphate per 100 pts. polyether | Rise time of foam (sec.) | Percent loss in C.L.D. at 25% strain by dry heat aging at 250° F. | | | |
|---|---|---|---|---|---|---|
| | | | Den. lbs./ft.³ (before heating) | Percent loss after 12 hrs. heating | Den. lbs./ft.³ (before heating) | Percent loss after 24 hrs. heating |
| I | 0 | 101 | 3.10 | 26 | 2.82 | 20 |
| II | 1 | 102 | 2.91 | 3 | 3.14 | −3 |
| III | 2 | 106 | 2.96 | −2 | 3.10 | −2 |
| IV | 4 | 106 | 3.43 | −13 | 3.16 | −2 |

As the above data indicate, the presence of the stabilizer successfully inhibits deterioration of the foam which would otherwise occur due to the presence of the tin catalyst. It should be further noted that use of the additives does not appreciably increase foaming time, nor does its use appreciably increase the density.

In the following examples, the three indicated components were prepared. Because a portion of the polyether is difunctional, the resulting foam is more sensitive to degradation caused by the tin catalyst. The preparations of the foams and their subsequent testing was carried out in the same manner as indicated in the preceding examples.

Polyether component: Pts.

Polypropylene oxide adduct of glycerine (mol. weight approximately 3,000) _____ 50
    Polyoxypropylene glycol (mol. weight approximately 2,000 _____ 50
    Dibutyl tin dilaurate _____ 0.5
    Freon 11 _____ 7.0
    Chlorine containing additive _____ ([1])

Activator component:

Water _____ 2.9
    Surface active agent [2] _____ 1.0
    Triethylene diamine _____ 0.075

Isocyanate component:

m-Toluene diisocyanate (80% by weight 2,4-isomer and 20% by weight 2,6 isomer) ____ 38.0

[1] See examples.
[2] A material as described in Example I(a) of Patent No. 2,834,748, Bailey et al., May 13, 1958.

| Ex. | Additive | Pts. additive per 100 pts. polyether | Rise time of foam (sec.) | Percent loss in C.L.D. at 25% strain by dry heat aging at 250° F. | | | |
|---|---|---|---|---|---|---|---|
| | | | | Den., lbs./ft.³ (before heating) | percent loss after 12 hrs. heating | Den., lbs./ft.³ (before heating) | Percent loss after 24 hrs. heating |
| V | None | 0 | 95 | 2.07 | ([1]) | 1.98 | ([1]) |
| VI | Tris (2-chloroethyl) phosphate | 2 | 97 | 2.13 | −3 | 2.01 | −8 |
| VII | do | 4 | 105 | 2.20 | −9 | 2.10 | −7 |

[1] Collapse.

In the following examples, the preparations of the foams and their subsequent testing were carried out in the same manner as Examples V through VII except that twice as much Freon 11 was used, viz., 14 parts. Also, the Paroil 170 LV was dissolved in the polyether component at 145° F.

| Ex. | Additive | Pts. additive per 100 pts. polyether | Rise time of foam (sec.) | Percent loss in C.L.D. at 25% strain by dry heat aging at 250° F. | |
|---|---|---|---|---|---|
| | | | | Density before heating (lbs./ft.³) | Percent loss after 24 hrs. heating |
| VIII | Tris (3,3-dichloropropyl) phosphate.[1] | 1.7 | -------- | 1.81; 1.85 | 2; 4 |
| IX | ----do.[1]---- | 3.4 | 108 | 1.88; 1.90 | 0; −2 |
| X | Paroil 170 LV [2] | 3.6 | 89 | 1.73; 1.80 | −13; −18 |

[1] Chlorine content of 49% by weight of total.
[2] A liquid aliphatic hydrocarbon having a chlorine content of 70% by weight of total and a mol. weight of 430 to 470.

Example XI

A. *Preparation of the surface active agent.*—151.0 grams of cyclic dimethyl polysiloxane tetramer and 32.6 grams of ethyltriethoxy silane, i.e., a 3:1 mol ratio, and 0.1 gram (85% active) of powdered potassium hydroxide were placed in a four neck flask fitted with a stirrer and condenser. The flask was then slowly heated with stirring to 150° C. over a three-quarter hour period. When the temperature reached 150° C. it was maintained thereat for five hours. The flask was then cooled to 100° C., and while a pressure of two inches of mercury was maintained, the contents of the flask was stripped of its light fractions by heating at temperatures up to 150° C. In this manner, 15 grams of material boiling at 60° to 95° C. were removed. The residue in the flask weighed 196 grams. The residue, after filtration, was obtained as a clear liquid weighing 196 grams.

188.4 grams of a monobutoxy oxyethylene-oxy-1,2-propylene monohydroxy compound which contained 50% by weight of ethylene oxide units and 50% by weight of propylene oxide units and having a molecular weight of 1570 along with 145 grams of toluene were charged into a flask fitted with a Dean-Stark trap and refluxed until no more water could be removed. In this manner, 0.05 cc. of water was removed. The material prepared above from the cyclic dimethyl polysiloxane tetramer and the ethyltriethoxy silane along with 0.3 cc. of trifluoroacetic acid were added to the flask and the Dean-Stark trap removed and replaced with a column packed with Raschig rings and outfitted with a distilling head. Thus, the above monohydroxy compound and the material prepared from the cyclic dimethyl polysiloxane tetramer and ethyl triethoxy silane were present in a mol ratio of 3:1. The flask was heated to 125° C. and the column allowed to come to equilibrium at full reflux during one and one-half hours. Then, a portion of the distillate was slowly taken off at 75° to 90° C. during three-quarters of an hour. Full reflux was carried out again for one hour in order to allow the column to come to equilibrium after which additional distillate was taken off at 80° to 90° C. Total distillate collected was 8.5 cc. of which 6 cc. was determined to be ethanol. The residue in the flask was cooled overnight. Then, an additional 0.2 cc. of trifluoroacetic acid was introduced and heating carried out for an additional three hours at full reflux at pot temperatures up to 135° C. An additional 2 cc. of distillate were removed at temperatures up to 95° C. Of this amount, 0.6 cc. was determined to be ethanol. The flask was cooled to 100° C. and 2.5 grams of sodium bicarbonate added to neutralize the trifluoroacetic acid. After refluxing for one-half hour, the contents of the flask was cooled and the salt formed during neutralization was removed by filtration. Then the salt free material was sparged with nitrogen and the toluene stripped off under reduced pressure. In this manner, 222 grams of product having an off-white color and a slightly viscous consistency was obtained. The product was found to be soluble in cold tap water, i.e., a clear solution was obtained.

B. *Preparation and testing of the resin.*—The resin was prepared and subsequently tested by following the procedure of Examples VIII, XI and X. However, 2.0 parts of tris(2-chloroethyl) phosphate was used as the additive and 1.0 part of the product prepared in part A. was used as the surface active agent. The data obtained is set forth below.

| Additive | Pts. additive per 100 pts. polyether | Rise time of foam (sec.) | Percent loss in C.L.D. at 25% strain by dry heat aging at 250° F. | |
|---|---|---|---|---|
| | | | Density before heating (lbs./ft.³) | Percent loss after 24 hrs. heating |
| None | 0 | 147 | 1.66+0.4 | +15; +19 |
| Tris (2-chloroethyl) phosphate. | 2 | 150 | 1.83+0.06 | −16; −15 |

In the preceding portion of the disclosure, examples of the various materials used in preparing our stabilized foamed resin have been set forth such as the polyethers, isocyanates, surface active agent, and the catalyst mixture. All of these are well known materials and have been used in the preparation of flexible polyurethane resins. Hence, the specific examples of these materials which appear herein are merely illustrative and are not to be construed in a limiting sense. Moreover, wherever one material is called for such as a polyisocyanate, a polyether, etc., a mixture can be readily used instead.

Having described our invention, what we claim as new and desire to secure by Letters Patent is:

1. A process for producing a flexible polyether based foamed polyurethane resin stabilized against deterioration which comprises mixing together a polyalkylene polyether having a hydroxylic functionality of at least 2, an organic polyisocyanate, water, a surface active agent and a catalyst mixture including amine and an organo metallic tin catalyst present in catalytic amounts which tends to promote decomposition of the ether linkage of said foamed resin, and thereafter allowing the resulting reaction mixture to react and foam thereby forming flexible polyurethane foamed resin, there being present in said reaction mixture at the time of foaming, as a stabilizer for the resulting foamed resin, at least one halogen containing material of the group consisting of
    (A) esters of (1) halogenated alcohols selected from the group consisting of 2-chloroethanol and dichloropropanol and (2) acids selected from the group consisting of phosphoric acid, boric acid and p-toluene sulfonic acid, and
    (B) halogenated hydrocarbons having chlorine as the sole halogen, the chlorine content thereof being at least about 25% by weight of the total weight,
said halogenated hydrocarbons being soluble in at least one of said polyether, polyisocyanate and water and compatible in the system resulting from the admixture of said polyether, isocyanate and water, said (A) and (B) being present in an amount of from about 0.5% to about 5.0% by weight of said polyether.

2. The process of claim 1 in which said polyether has a functionality of at least two and an equivalent weight of between about 100 to about 2000.

3. The process of claim 1 in which said stabilizer is tris(2-chloroethyl) phosphate.

4. The process of claim 1 in which said stabilizer is tris(3,3-dichloropropyl) phosphate.

5. The process of claim 1 in which said stabilizer is a halogenated hydrocarbon having chlorine as the sole halogen, the chlorine content thereof being at least about 25% by weight of the total weight, said halogenated hydrocarbon being soluble in at least one of said polyether, polyisocyanate and water and compatible in the system resulting from the admixture of said polyether, polyisocyanate and water.

6. The process of claim 1 in which said stabilizer is a halogenated hydrocarbon having chlorine as the sole halogen, the chlorine content thereof being 70% by weight of the total and the molecular weight being 430 to 470.

7. The process of claim 1 in which said surface active agent is a water soluble siloxane-oxyalkylene block copolymer.

8. The process of claim 1 in which said surface active agent is the reaction product of 3 mols of a monobutoxy oxyethylene-oxy-1,2-propylene monohydroxy compound containing 50% by weight of ethylene oxide units and 50% by weight of propylene oxide units and having a molecular weight of about 1570 and one mol of the reaction product of 3 mols of cyclic dimethyl polysiloxane tetramer and one mol of ethyltriethoxy silane.

References Cited in the file of this patent

UNITED STATES PATENTS

| | | |
|---|---|---|
| 2,834,748 | Bailey et al. | May 13, 1958 |
| 2,956,031 | Khawam | Oct. 11, 1960 |

OTHER REFERENCES

Mobay Chemical Company, "A One Shot System for Flexible Polyether-Urethane Foams," No. 10, 1958.

Union Carbide Chemical Co., "One-Step Urethane Foams," F-40487, February 1959.

UNITED STATES PATENT OFFICE
CERTIFICATE OF CORRECTION

Patent No. 3,067,149                            December 4, 1962

Bernard A. Dombrow et al.

It is hereby certified that error appears in the above numbered patent requiring correction and that the said Letters Patent should read as corrected below.

Column 3, line 39, for "or", first occurrence, read -- of --; column 5, line 24, for "aind" read -- and --; column 8, line 6, for "XI" read -- IX --; line 8, for "ol" read -- of --; same column 8, in the table, fourth column, lines 1 and 2 thereof, for "+", each occurrence, read -- $\pm$ --.

Signed and sealed this 12th day of November 1963.

(SEAL)
Attest:

ERNEST W. SWIDER                          EDWIN L. REYNOLDS
Attesting Officer                           Acting Commissioner of Patents